(12) United States Patent
Thompson

(10) Patent No.: US 11,461,720 B1
(45) Date of Patent: Oct. 4, 2022

(54) METHOD FOR IMPARTING SUSTAINABILITY CREDENCE ATTRIBUTES FOR ANIMAL SOURCE FOOD PRODUCTS

(71) Applicant: EnergyWorks BioPower, LLC, Arnold, MD (US)

(72) Inventor: Patrick Clark Thompson, Arnold, MD (US)

(73) Assignee: EnergyWorks BioPower, LLC, Arnold, MD (US)

( * ) Notice: Subject to any disclaimer, the term of this patent is extended or adjusted under 35 U.S.C. 154(b) by 0 days.

(21) Appl. No.: 17/672,260

(22) Filed: Feb. 15, 2022

Related U.S. Application Data

(60) Provisional application No. 63/167,262, filed on Mar. 29, 2021.

(51) Int. Cl.
*G06Q 10/06* (2012.01)
*G06Q 50/02* (2012.01)

(52) U.S. Cl.
CPC . *G06Q 10/06316* (2013.01); *G06Q 10/06395* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 2007/0265897 A1 * | 11/2007 | McMorris, III | G06Q 40/04 705/7.29 |
| 2011/0192213 A1 * | 8/2011 | Zimmerman | A01K 5/0225 73/23.3 |

(Continued)

FOREIGN PATENT DOCUMENTS

| | | | | |
|---|---|---|---|---|
| WO | WO-2021097388 A1 * | 5/2021 | | G01N 33/0031 |
| WO | WO-2021213849 A1 * | 10/2021 | | |

OTHER PUBLICATIONS

Bonne, Karijn; Verbeke, Wim; "Religious values informing halal meat production and the control and delivery of halal credence quality"; Agriculture and Human Values 25.1: 35. Springer Nature B.V. (Jan. 2008) (Year: 2008).*

(Continued)

*Primary Examiner* — Leland Marcus
(74) *Attorney, Agent, or Firm* — Laubscher & Laubscher PC

(57) ABSTRACT

A method for imparting sustainability credence attributes for animal source food products is provided. First, at least one animal source food product is produced. The manure associated with that production is collected and treated, and the nitrogen and phosphorus content of the manure is analyzed and time stamped. At least one sustainability outcome from the treated manure is quantified, and an animal source food product, including a product package, animal package lot, individual live animal, or a plurality of live animals, is identified and labeled, and direct and indirect sustainability outcomes are linked with the animal source food product. Sustainability outcomes are demonstrated to buyers or post-processors of animal source food products, first by combining the sustainability outcome data and food animal production data with food animal producer provenance data from the same or a corresponding time interval, and then by providing access to that data.

11 Claims, 4 Drawing Sheets

(56) References Cited

U.S. PATENT DOCUMENTS

| | | | | |
|---|---|---|---|---|
| 2011/0218885 A1* | 9/2011 | Manski | ............ | G06Q 30/0282 |
| | | | | 705/347 |
| 2017/0290304 A1* | 10/2017 | Thompson | ............ | A01K 31/20 |
| 2019/0197278 A1* | 6/2019 | Kastury | ............ | G06K 19/06178 |
| 2020/0034782 A1* | 1/2020 | Hsieh | ................ | G06Q 30/0631 |
| 2021/0148891 A1* | 5/2021 | Beal | ...................... | G16B 20/00 |

OTHER PUBLICATIONS

Hoffman, T. W.; "Benchmark of lamb quality in U.S. retail and foodservice markets"; (Order No. 3746168). Available from ProQuest Dissertations and Theses Professional. (1755642109). (Year: 2015).*

Pullman, Madeleine E; Dillard, Jesse; "Values based supply chain management and emergent organizational structures"; . International Journal of Operations & Production Management; 30.7: 744-771. Emerald Group Publishing Limited. (2010) (Year: 2010).*

\* cited by examiner

METHOD FOR IMPARTING SUSTAINABILITY CREDENCE ATTRIBUTES FOR ANIMAL SOURCE FOOD PRODUCTS

This application claims the benefit of U.S. provisional patent application No. 63/167,262 filed Mar. 29, 2021.

BACKGROUND OF THE DISCLOSURE

The present disclosure relates generally to animal source food production and waste treatment in connection therewith, and more specifically to credence attributes related to the sustainable management and treatment of waste.

Sustainability-minded consumer, business and institutional buyers want to know how, where and when food products are produced. Attributes of interest may include protection of the environment, environmental equity/justice, climate change, co-benefits, such as renewable energy and circular use of resources, and provenance information such as sourcing of animal feed, identification of feed additives, animal welfare, and the place and time of production.

Unlike physical attributes such as quantity, weight, appearance, aroma, texture, and taste, certain product attributes cannot be searched, directly observed, or experienced by a buyer before, during or after the product purchase. Such attributes are referred to as "credence attributes". The environmental and social footprint of a product and/or its producer and the overall sustainability of a product supply chain are examples of credence attributes. Sustainability concerns often influence buyer decisions to purchase and willingness to pay. In the past, buyers were less aware of potential product impacts, and they relied upon brand reputation for assurance of credence attribute claims. With expanding product choices, more options for where and how to purchase, and greater access to information, buyers increasingly depend on product labels and narrative as the basis for credence attribute discovery. Buyers are often willing to pay extra for products with trustworthy and user-friendly evidence of sought-after credence attributes.

Animal waste (commonly referred to as "manure") is often a major contributor to the negative environmental and social impacts associated with animal source food production. Despite advances in other aspects of modern food animal production, traditional storage and land application remain the primary methods of manure management. These practices often cause ecological imbalance of nutrients and other harmful impacts to the environment and the wellbeing of workers and residents of nearby communities. The extent of these negative outcomes generally increases with the scale and concentration of animal source food production.

Manure treatment technology ("MTT") systems can capture or transform polluting forms of manure nutrients to prevent their release to the environment and can be sized to match the waste output of multiple animal production operations. MTT systems can also provide sustainability co-benefits such as renewable energy, recovery and recycling of resources, reduction of air pollutants and greenhouse gases, and preservation of environmental equity by the elimination of nuisance odors, pests, and the spread of pathogens to nearby communities.

Currently, it is difficult and often impossible for consumers to validate sustainability claims of animal source food products. There is a need, therefore, to provide a convenient, reliable, and practical method and system for demonstrating such claims to buyers that purchase animal source food products through the commercial food supply chain.

SUMMARY OF THE DISCLOSURE

Accordingly, it is an object of the present disclosure to provide a method for conveying sustainability credence attributes for animal source food products. First, at least one animal source food product is produced. The manure associated with the production of the product is collected and its nutrient composition is analyzed and time stamped. At least one direct or indirect sustainability outcome from treatment of the manure is quantified and linked to an animal source food product, including a product package, package lot, individual live animal, or a plurality of live animals (e.g., a flock).

In a preferred embodiment, the sustainability outcomes are conveyed to buyers or supply chain post-processors and packagers of animal source food products, first by combining the sustainability outcome, food animal production, and producer provenance data for a discrete production lot time interval, then providing buyer access to that data. Preferably, data is posted to an internet website, and is then accessed by a data indicator that is affixed to the product package, package lot, individual live animal, or a plurality of live animals.

In another embodiment, the sustainability outcome data, the animal source food product data, and the producer provenance data are transferred to buyers, post-processor manufacturing, warehousing, supply chain logistical intermediaries, and end-use buyers by an immutable supply chain information system. This provides animal source food product credence attribute data traceability across the supply chain from the animal producer to the final point of sale.

In yet another embodiment, data pertaining to the sustainability outcomes and animal source food products are synchronously linked during a defined time interval or defined offset intervals having defined start and end times.

Preferably, the steps detailed for each of the preceding embodiments are prescribed and performed in accordance documented procedures that are certified for compliance with at least one of a Quality Management System and a Credence Attribute Data Management System and are periodically audited by a qualified independent agent.

BRIEF DESCRIPTION OF THE FIGURES

Other objects and advantages of the disclosure will become apparent from a study of the following specification when viewed in the light of the accompanying drawings, in which.

DETAILED DESCRIPTION

Figure 1:
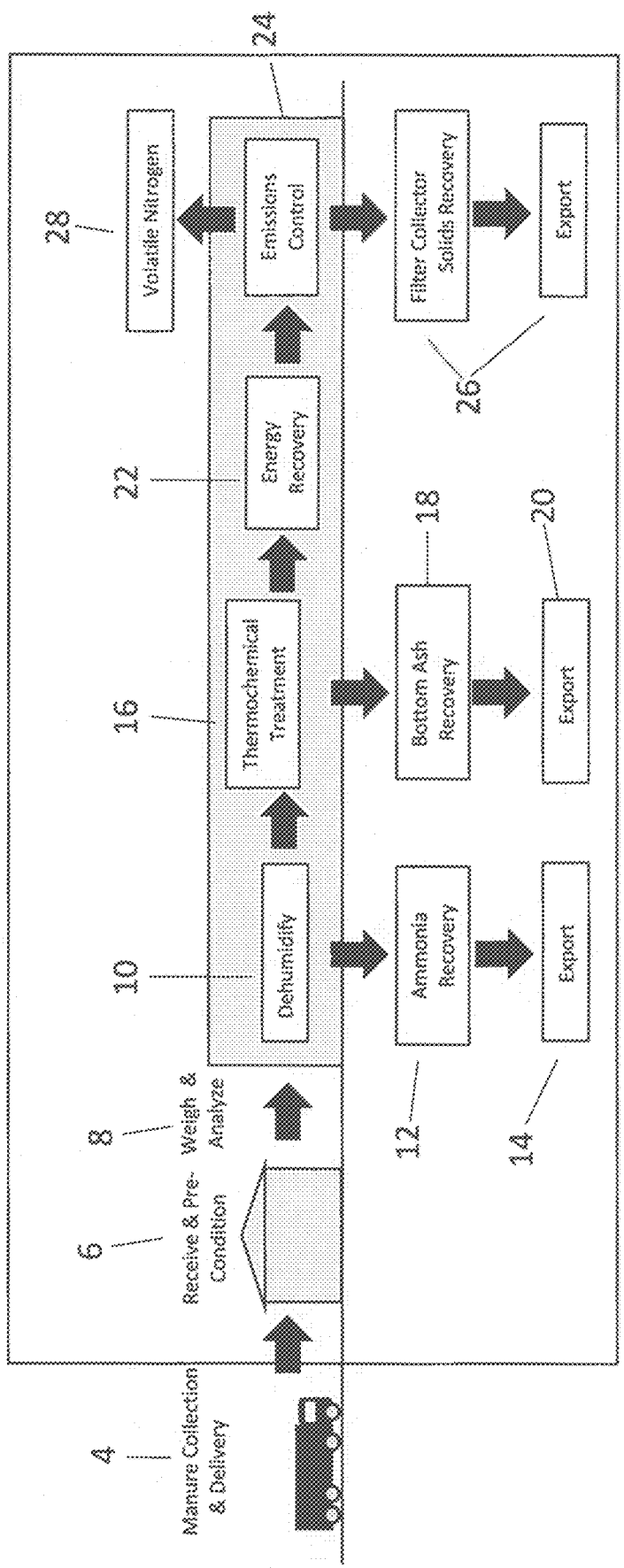
FIG. 1 is a schematic diagram of a manure treatment technology system according to the prior art.

The present disclosure relates to a method for quantifying and recording sustainability outcomes that result from operations of a manure treatment technology ("MTT") system and conveying these outcomes to animal source food product supply chain participants and end-use buyers/consumers. FIG. 1 shows a typical MTT system 2 that captures and/or neutralizes manure constituents which would otherwise be lost to the environment as air and water pollutants under industry accepted methods of manure management. MTT systems can also produce renewable energy, reduce greenhouse gas emissions, recover nutrient and mineral resources for reuse, and reduce negative environmental, nuisance and health risks to local communities. These and other quantifiable outcomes, individually or in the aggregate, improve the sustainability of the animal source food supply chain. Since these outcomes cannot be directly observed or experienced, during or after the point of product sale, purchasers that desire proof of such outcomes need access to such credible evidence. These outcomes are known as sustainability credence attributes.

Referring again to FIG. 1, a typical large scale MTT system and its process steps are shown. First, manure is collected from animal producers and delivered 4 to a receiving facility for screening to remove debris and normalize particle size 6. An optical scanning device and weigh scale measure moisture and nutrient mass flow 8 as screened manure is conveyed to the inlet of a drying system where manure is dehumidified to enhance downstream process performance 10, and a packed media acid reagent scrubber recovers ammonia 12 from the dehumidification system exhaust. A liquid ammonium sulfate byproduct is then exported 14 for use as an agricultural crop fertilizer. Then, a sub-stoichiometric thermochemical reactor volatilizes the organic content of dried manure feedstock, creating a synthesis gas mixture that is combusted in a close-coupled thermal oxidizer 16. Bottom ash residual is continuously cooled and transferred to temporary storage 18 and then transferred to a truck loadout hopper for export and upcycling 20 as commercial animal feed ingredient and plant fertility products. Thermal energy from combustion of synthesis gas is recovered 22 to produce steam for process heat and electricity generation. Combustion flue gas is treated by dry sorbent injection and filtered to control airborne emissions 24. Lastly, fly ash and spent sorbent solids are recovered from the filter collector and exported for blending with thermochemical bottom ash solids as commercial plant fertility products 26, and a continuous emissions monitor and in-situ tunable laser instruments measure reactive forms of nitrogen and criteria contaminants as they are exhausted from the plant stack 28.

Figure 2:
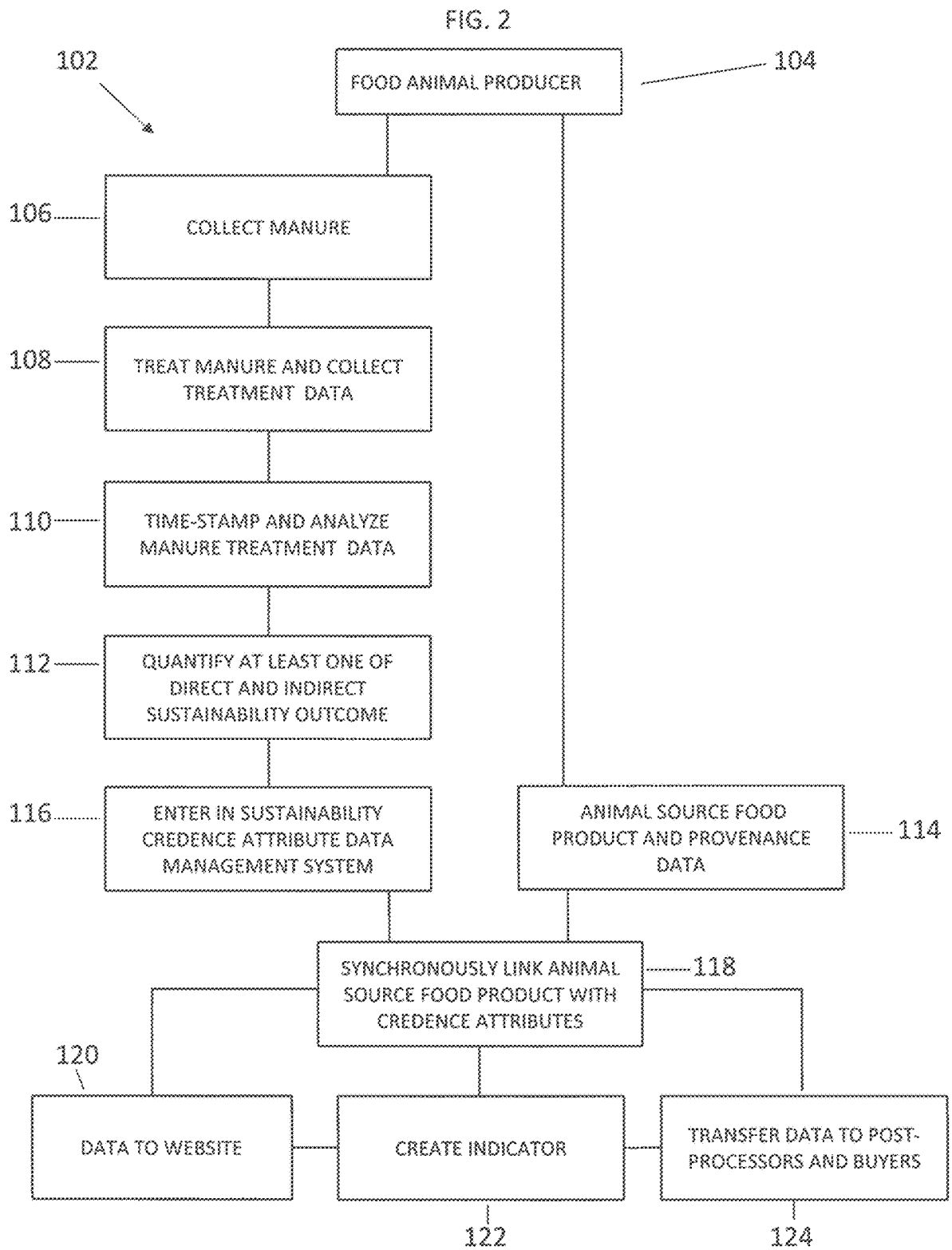
FIG. 2 is a flow chart of a first embodiment of method steps for collecting and conveying animal source food product sustainability attributes.

Referring now to FIG. 2, a preferred method for quantifying and imparting sustainability credence attributes for animal source food products 102 will be described. At least one food animal producer 104 produces at least one animal source food product and manure associated with that production is collected 106. The manure is treated and data relating to the treatment is collected 108. The manure data is then analyzed and time-stamped 110, and at least one sustainability outcome from the treated manure is quantified 112 and entered in a sustainability credence attribute data management system 116. Lastly, the at least one animal source food product, including an animal source food product package, product package lot, individual live animal, or a plurality of live animals, and associated provenance data are identified 114, and linked with direct and indirect sustainability outcome data 118.

From there, sustainability outcomes are conveyed to post-processors, supply chain logistical intermediaries and buyers of animal source food products. Preferably, the data is made accessible by posting it to an internet website 120. The data is accessed by a data indicator that is affixed to each animal source product package, product package lot, individual live animal, or a plurality of live animals 122. All sustainability attribute data, including direct and indirect sustainability outcomes, and animal source food product provenance data are transferred to buyers, post-processor manufacturing, warehousing, and supply chain logistical information systems 124. This provides sustainability credence attribute data of an animal source food product across the supply chain, from the animal producer to the final point of sale.

Sustainability outcomes that are time-stamped and quantified by analyzing manure treatment data preferably include nitrogen and phosphorus pollutant prevention, renewable electricity production, avoided greenhouse gas emissions that are the result of eliminating long-term storage and land application of manure, and recovery and reuse of solid byproduct materials. A further quantified outcome may include a continuous monthly average manure storage inventory of a food animal producer being less than the amount generated during a three-day period. Also, odors, ammonia, or airborne dust and pathogens that are associated with manure can be measured against baseline amounts of odors, ammonia, and airborne dust and pathogens at locations that are in proximity to an animal production area and the manure treatment system. Lastly, the presence of rodents, flies and other insects that are commonly associated with animal manure can be measured against baseline levels of rodents, flies and other insects at designated public and residential locations in proximity to an animal production facility and its associated manure treatment system.

As noted above, all relevant data is posted to an internet-based location 118, and accessed by a unique data indicator 120, such as an optical code affixed to the animal source food product, to provide access to sustainability credence attribute data of an animal source food product across the supply chain.

Figure 3:
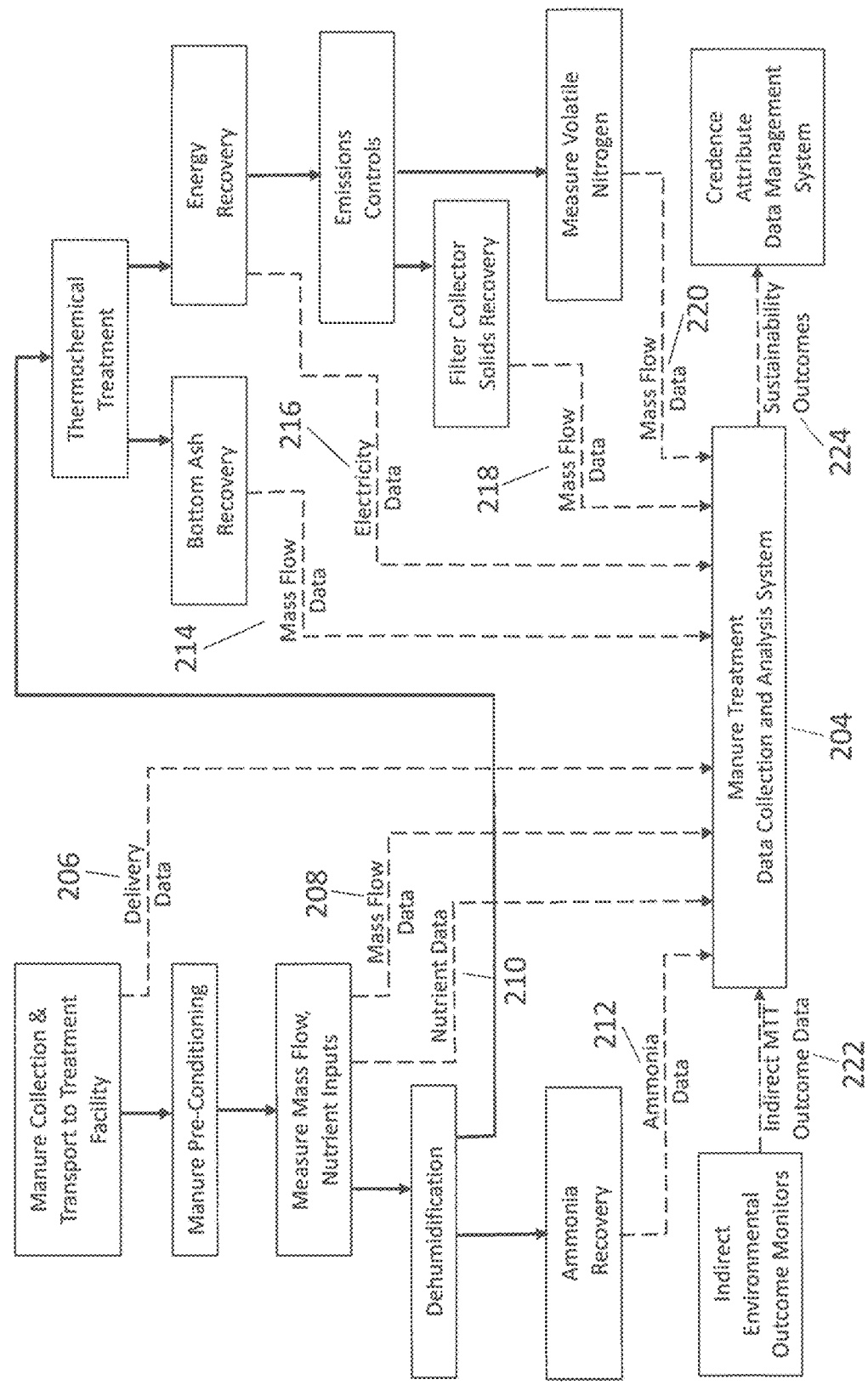
FIGS. 3 and 4 are schematic diagrams, respectively, of a process according to a second embodiment for collecting and demonstrating food animal product sustainability attributes.

Now referring to FIGS. 3 and 4, a second embodiment of the present method and process related to producing an animal source food product, collecting and analyzing manure treatment data, and demonstrating sustainability attributes will be described. Referring first to the data collection 202 of FIG. 3, there is a Manure Treatment Data Acquisition and Analysis System 204, preferably ISO-9001/ISO-14001 certified, that collects and time stamps data from treatment of a food animal producer's manure and performs calculations to quantify sustainability outcomes from said treatment. These outcomes are linked with producer products or product lots from the same or corresponding time interval (FIG. 4, reference numeral 238), creating credence attributes of the products to which they are attached.

The process data from the MTT system is collected as follows. A plant truck scale weighs each truckload of manure delivered to the MTT system. The food animal producer source and time of delivery are then recorded together with the delivered weight 206. The manure is pre-conditioned by screening and transferred to dehumidification system. The mass flow in pounds per hour 208 is continuously measured by a belt scale and concentrations of moisture, nitrogen and phosphorus are continuously measured as weight percentages the manure mass 210 are by an in-situ near infrared (NIR) spectroscopy scanning instrument. The quantity and conductivity of ammonium sulfate are continuously measured in gallons per hour and Siemens per meter by inline flow and conductivity instruments, respectively. Recovered ammonium sulfate quantities are recorded in total gallons as they are exported from the treatment facility 212 for use as a crop fertilizer product. Further, each truckload of bottom ash from the thermochemical reactor is weighed in pounds by the plant truck scale 214 and electric power is continuously measured by a revenue-grade meter in kilowatts and kilowatt hours at a generator outlet breaker 216. Fabric filter collector solids are collected and weighed in pounds by the plant truck scale 218. Plant exhaust stack ammonia and oxides of nitrogen flow rates are continuously measured in pounds per hour by an in-situ tuned laser instrument and a continuous emissions monitoring system, respectively 220. The Manure Treatment Data Collection and Analysis System 204 records Manure Treatment System data inputs then quantifies direct sustainability outcomes during a designated time interval. These include tons of manure processed ($M_t$), pounds of nitrogen pollutants eliminated from the environment ($N_t$), pounds of phosphorus eliminated from the environment ($P_t$), gallons of ammonium sulfate in gallons recovered ($AN_t$), pounds of thermal reactor bottom ash recovered ($BA_t$), pounds of filter collector solids recovered ($FS_t$), kilowatt-hours of renewable electricity generated ($E_t$), and tons of $CO_2e$ greenhouse gas avoidance by elimination of storage and land application of manure ($GHG_t$). Data pertaining to indirect environmental outcomes 222 such as ambient air quality, nuisance pest, and public health are monitored in cooperation with local community residents and authorities and then recorded and analyzed by the Manure Treatment Data Collection and Analysis System 204 to quantify indirect environmental outcomes. Direct and indirect manure treatment system outcomes 224 are linked with food animal producer production data (FIG. 4, reference numeral 238) to generate specific product or product lot sustainability credence attributes.

Figure 4:
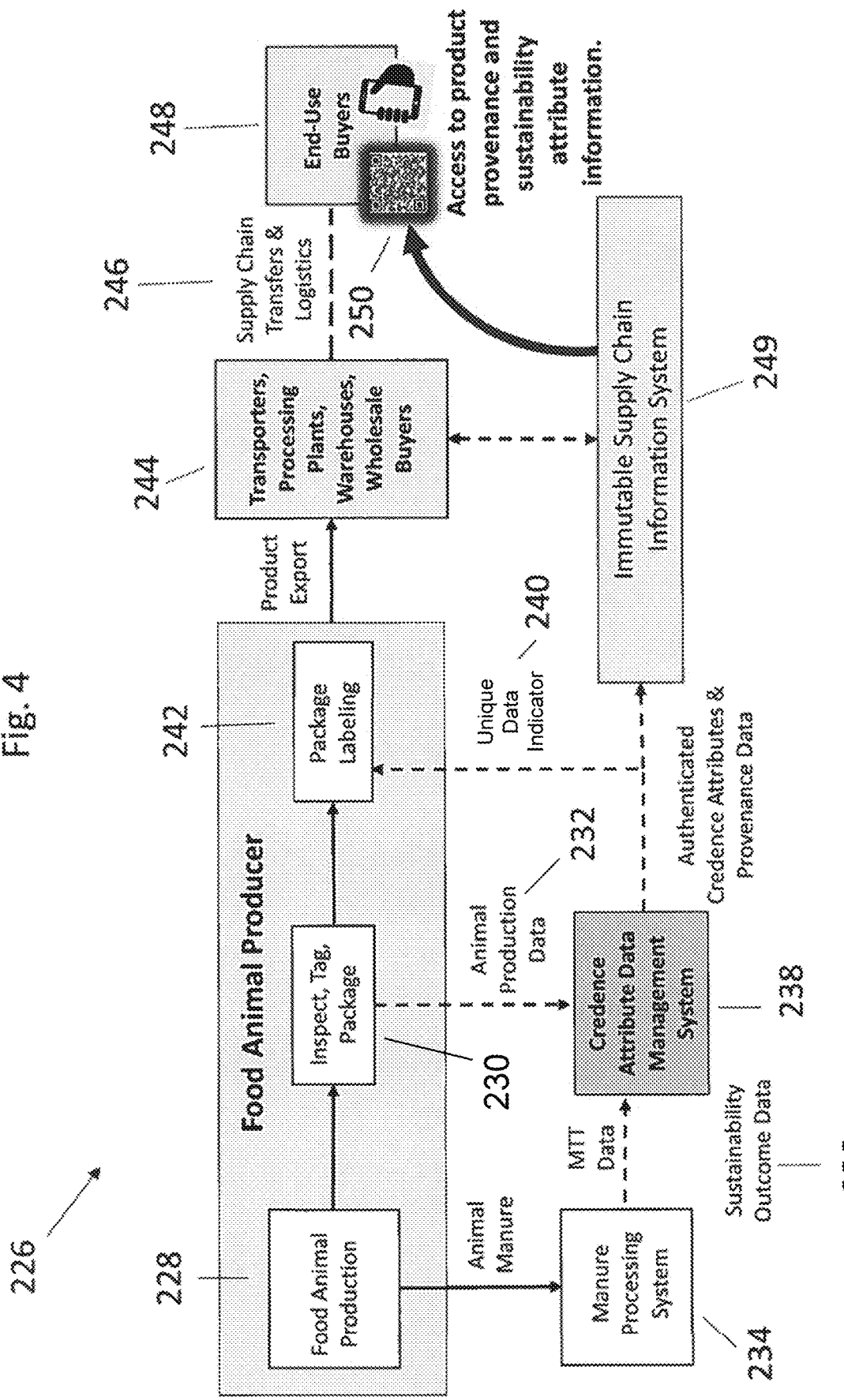

Referring now to FIG. 4, the general process 226 for producing an animal source food product, treating the manure associated with that product and demonstrating sustainability attributes will be described. An animal source food product is produced 228, and the food product is inspected, tagged, and packaged 230. Product-specific identification and associated provenance data 232 are transmitted to the Credence Attribute Data Management System 238. Meanwhile, the manure associated with said product is collected and sent to a manure treatment system 234. Data is collected and analyzed to quantify direct and indirect manure treatment sustainability outcomes 236 as previously described and transmitted to the Credence Attribute Data Management System 238, where sustainability outcome data is linked with synchronously associated animal source food product and provenance data and a unique product identifier is assigned. A machine-readable optical image 240, is generated and applied to the food product 242 providing buyers or post-processors 244, and supply chain logistics intermediaries 246 through an internet immutable supply chain information system 249 and, ultimately, end users 248, access to product-specific provenance and sustainability attribute information by means of a QR code or similar optical image 250 that can be read by a smart phone or other portable device, to make more informed purchasing decisions during the shopping experience.

It is understood that the present invention can be extended to manure treatment technologies that provide verifiable reductions in airborne pollutants within and exhausted from animal housing units. In a manner consistent with the embodiments described above, housing unit emissions can be quantified and linked to food animal products and production lots of live animals.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. An integrated technology and market-based method for producing at least one value-added animal source food product with at least one quantified sustainability outcome, comprising the steps of:
    a) producing and time stamping at least one animal source food product;
    b) collecting a quantity of manure equivalent to that generated from production of the at least one animal source food product; analyzing the chemistry of said manure using a calibrated near infrared (NIR) spectroscopy instrument;
    c) treating said manure following said analyzing step using a system of integrated technologies that transform the physical and chemical properties of manure constituents to produce renewable energy, eliminate pollutants, nuisance odors, rodent and insect pests and health risks to nearby residents, and recover reusable byproducts;
    d) quantifying and time stamping at least one of direct and indirect sustainability outcome from said manure treating step;
    e) identifying and labeling at least one of an animal source food product package, an animal source food package lot, an individual live animal, and a plurality of live animals; and
    f) linking at least one of the quantified direct and indirect sustainability outcomes with the at least one animal source food product, animal source food package lot, individual live animal and a plurality of live animals.

2. A method as defined in claim 1, and further comprising the step of:
    (g) providing a demonstration of sustainability outcomes to buyers or post-processors of animal source food products, including the steps of:
        (1) combining sustainability outcome and food animal production data from said linking step with food animal producer data from the same or corresponding time interval, accounting for timing offset between animal source food product production and manure treatment; and
        (2) providing a machine readable optical image with the product package, package lot, individual live animal, or plurality of live animals from said identifying and labeling step to access the data from said combining step.

3. A method as defined in claim 2, wherein said step of providing a demonstration of sustainability outcomes further includes the step of:
    (3) posting data from said combining step to an internet-based location to provide transparency of information from said combining step and explanations as to how, when and where the product and its associated sustainability outcomes were produced.

4. A method as defined in claim 3, wherein said unique data indicator providing step includes affixing a consumer and commercial optical code to the animal source food product, and linking the optical code to an information rich internet website that provides an explanation of the animal source food product environmental and social value-added.

5. A method as defined in claim 4, and further comprising the step of:

(a) transferring data from said combining step to post-processor manufacturing, warehousing, and supply chain logistical information systems and buyers to provide sustainability credence attribute data of an animal source food product throughout the supply chain from the animal producer to the final point of sale.

6. A method as defined in claim 1, wherein said linking step includes synchronously linking sustainability outcomes with animal source food products produced during a defined time interval or defined offset intervals having defined start and end times.

7. A method as defined in claim 6, wherein said steps are prescribed and performed in accordance with certified compliant procedures of at least one of Quality Management System and Sustainability Outcome Credence Attribute Data Management System.

8. A method as defined in claim 7, wherein said steps are periodically and independently audited.

9. A method as defined in claim 1, wherein said manure treatment step includes at least one of:
   (1) documenting the manure transported from at least one food animal production facility to a manure treatment system;
   (2) pre-conditioning the manure to remove debris and improve physical homogeneity;
   (3) continuously measuring and documenting manure mass flow and concentrations of nitrogen and phosphorus entering the manure treatment system;
   (4) dehumidifying the manure to improve downstream process performance;
   (5) filtering and treating exhaust from manure dehumidification to capture particulate, control pollutant emissions, and recover reusable ammonia;
   (6) thermochemically treating the manure to produce and combust gaseous fuel to create thermal energy, transform nitrogen compounds into non-polluting forms, and recover reusable phosphorus and other bottom ash materials;
   (7) recovering thermal energy to drive the manure treatment process and produce electricity;
   (8) treating flue gas to capture and recycle materials and prevent the release of airborne pollutants; and
   (9) continuously measuring trace amounts of ammonia and oxides of nitrogen exiting the treatment system as flue gas exhaust as inputs to nitrogen mass balance calculations of a manure treatment system.

10. A method as defined in claim 1, wherein said quantifying and time stamping at least one of direct and indirect sustainability outcomes step includes at least one of quantifying and time-stamping:
    (1) nitrogen and phosphorus pollutant prevention;
    (2) avoided air pollutants by eliminating long-term storage and land application of manure;
    (3) renewable electricity production;
    (4) water conservation by minimizing water evaporation for waste heat rejection and process water recovery and reuse;
    (5) avoided greenhouse gas emissions by eliminating long-term storage and land application of manure;
    (6) circular use of soil amendment, fertilizer, and animal feed ingredient nutrients and minerals;
    (7) reduction of negative environmental and social impacts to local communities; and
    (8) operational impacts of climate change such as increased frequency and severity of precipitation events are minimized by design features and operating systems.

11. A method as defined in claim 1, wherein said quantifying and time stamping at least one of direct and indirect sustainability outcomes step includes at least one of quantifying and time-stamping:
    (1) a continuous monthly average manure storage inventory of a food animal producer being less than the amount produced during a three-day period; at least one of odors, ammonia, and airborne dust and pathogens associated with manure being less than baseline amounts of odors, ammonia, and airborne dust and pathogens at designated public and residential locations in proximity to an animal production area and manure treatment system; and
    (2) at least one of a presence of rodents, flies and other insects associated with manure being less than pre-defined target levels of rodents, flies and other insects at designated public and residential locations in proximity to an animal production facility and manure treatment system.

* * * * *